United States Patent [19]

Müller et al.

[11] Patent Number: 4,846,505

[45] Date of Patent: Jul. 11, 1989

[54] CONNECTING PIECE

[76] Inventors: Lothar Müller, Kornbergweg 5, 7300 Esslingen; Gert Schmetzer, Hindenburgstr. 2, 7302 Ostfildern 2, both of Fed. Rep. of Germany

[21] Appl. No.: 244,352

[22] Filed: Sep. 15, 1988

[30] Foreign Application Priority Data

Oct. 13, 1987 [DE] Fed. Rep. of Germany ....... 3734548

[51] Int. Cl.$^4$ .............................................. F16L 35/00
[52] U.S. Cl. ........................................... 285/3; 285/39; 285/243; 285/257; 285/259; 285/349; 285/423; 285/906; 285/921
[58] Field of Search ............... 285/243, 373, 257, 419, 285/259, 3, 349, 423, 906, 921

[56] References Cited

U.S. PATENT DOCUMENTS

| 815,995 | 3/1906 | Williamson et al. | 285/259 X |
|---|---|---|---|
| 1,390,564 | 9/1921 | Knorr | 285/243 |
| 1,970,050 | 8/1934 | Mathey | 285/259 X |
| 2,314,000 | 3/1943 | Lusha et al. | 285/257 X |
| 3,073,628 | 1/1963 | Cline et al. | 285/243 |
| 4,524,999 | 6/1985 | Pate et al. | 285/419 X |
| 4,666,192 | 5/1987 | Zamora | 285/257 X |

FOREIGN PATENT DOCUMENTS 2025154 1/1980 United Kingdom ................ 285/419

Primary Examiner—Dave W. Arola
Attorney, Agent, or Firm—McGlew & Tuttle

[57] ABSTRACT

The invention relates to a connecting piece for connecting tubular members such as hoses, pipes, or other structural parts, carrying fluids with each other. A clamping part is available which has two half shell-shaped clamping halves with one clamping surface curved in accordance with the outer circumference of the end of the tubular member to be inserted. In their plug-in position the clamping halves are arranged at a distance to each other which permits insertion of the plug-in end of a tubular member. In their clamping position they enclose non-displaceably the plug-in end of the pipe, the hose or similar and they are simultaneously fixed on a contact part of the connecting piece.

17 Claims, 2 Drawing Sheets

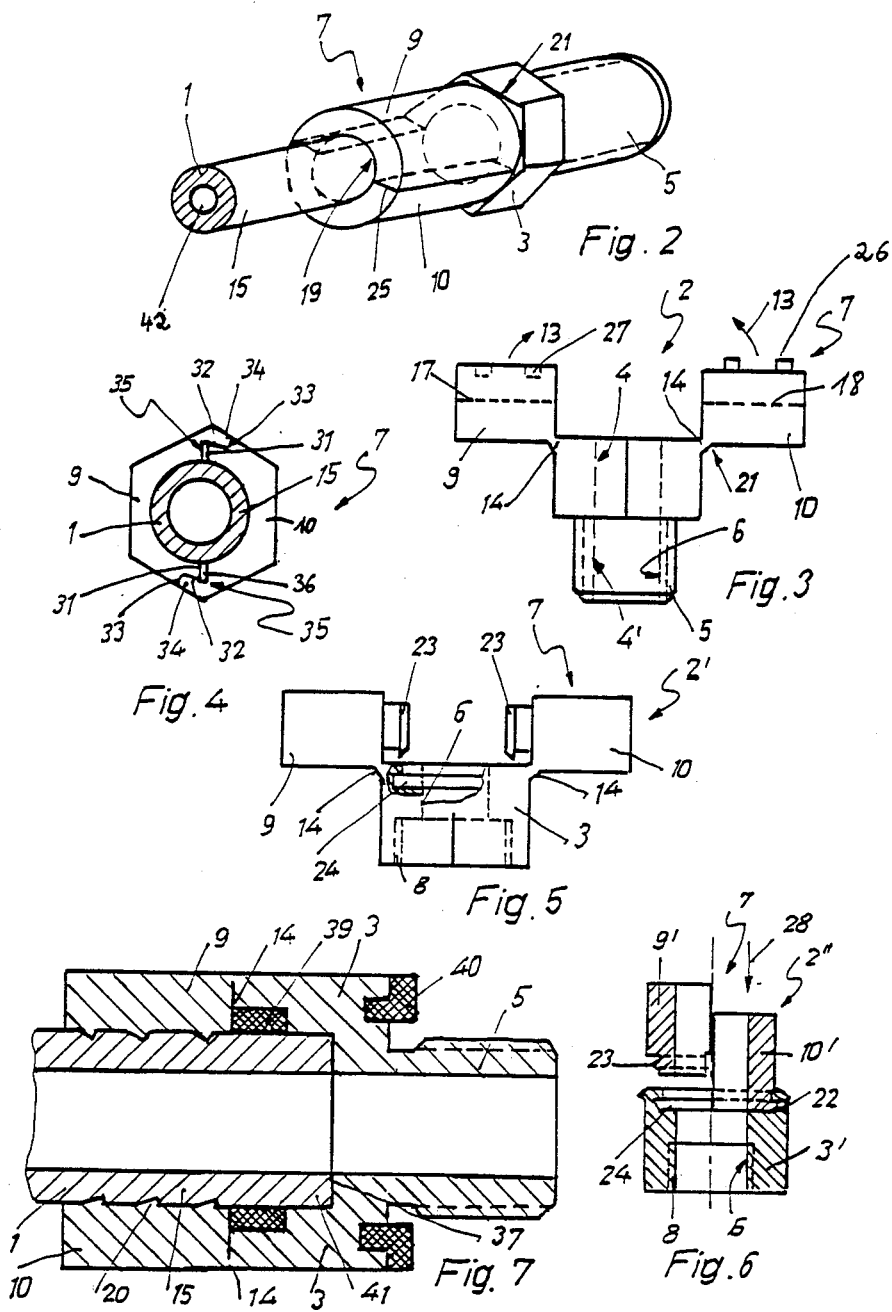

CONNECTING PIECE

BACKGROUND OF THE INVENTION

Field of the Invention

This invention relates in general to connecting pieces for connecting tubular members such as hoses, pipes, and other structural parts carrying fluids, with each other, and in particular, to a new and useful connecting piece for connecting tubular members carrying fluids with each other with at least one holding part for the plug-in end of a given pipe or given hose.

Such connecting pieces are applied in the field of pneumatics, in general, for the purpose of coupling two or more hoses or pipes with each other, or in order to connect a hose or a pipe to a pneumatic structural part, for example a pressure storage, a cylinder or similar. The connecting piece contains holding parts corresponding to the number of pipes or hoses and, in the case of the field of pneumatics a threaded nipple or a screw connection. The holding part itself contains in the known connection pieces, compare, for example DEP No. 26 12 871, a pipe-shaped nipple onto which the plug-in end of the hose to be connected is set and subsequently secured against being pulled out with a screw cap. The reliable pressure seal achieved in the process, however, still requires relatively considerable constructional involvement, in particular in view of the production of the required threaded parts. Furthermore, fastening the individual hoses to the connecting piece takes a relatively long time due to the fact that the holding parts are built as screw connections and when space is tight satisfactory insertion of the required screw tools is frequently difficult, if not impossible.

SUMMARY OF THE INVENTION

The invention provides a connecting piece according to the initially mentioned kind which is simple in structure and, hence, inexpensive to manufacture and permits connecting and disconnecting tubular members rapidly even under limited space conditions.

The invention provides a clamping part and has two half shell-shaped clamping halves with clamping surfaces curved in each case corresponding to the external circumference of the plug-in end, that the clamping halves in their plug-in position are arranged at a distance form each other which permits inserting the pipe or the hose, and in their clamping position enclose the plug-in end of the pipe or the hose forming a non-displaceable clamping connection whereby they are fixed on a connecting part of the connection piece and the two clamping surfaces coaxially surround the plug-in end forming a cylindrical arrangement with clamping contact. Since the holding part is formed without threads it can be produced more simply which reduces the overall manufacturing costs of the connecting piece. Furthermore, by forming the holding part as a clamping part insertion of screw tools when fastening hoses or pipes now becomes superfluous, rather, it is now possible to connect or couple the particular plug-in end without tools and entirely manually. As the number of sites for their use increase to include those in tight spaces, even the disconnection can take place directly by hand. Reliable seating of the plug-in end on the connecting piece is ensured by the two cylindrically curved clamping surfaces which provide uniform area pressure and secure the plug-in end against being pulled out.

The two clamping halves are preferentially formed integrally with the connecting part via a bending point so that they are arranged on it in the manner of wings. The two clamping halves oppose each other and for the purpose of inserting the particular pipe can be spread open, while they only need to be bent back together to be brought into the clamping position so that they firmly enclose the clamping surfaces of the plug-in end. The clamping halves are preferentially integrally formed in one piece with the connecting part via bending points formed in particular as web of small material thickness.

In another embodiment, the clamping halves are formed as separate structural parts which are detachably arranged in the clamping position on the connecting part. Their manufacture takes place, however, in one piece with the connecting part on which they remain until they are used so that they cannot be lost. Only shortly before use are they broken off from the connecting part on which they are disposed, for example, likewise with a web.

It is advisable that the clamping halves can be secured in the clamping position against widening respectively spreading open. This can be done with a detachable locking or snapping connection or, in case only slight clamping forces need to be provided, via a plug connection. For undoing the connection from the clamping position, an unlocking device can be available which usefully is formed in the shape of at least one depression in the contact region of the clamping halves into which an unlocking tool, for example the point of a screwdriver can be inserted whose rotation subsequently pushes the two clamping halves apart.

To secure the two clamping halves it is also possible to provide a guard ring which can be placed around the clamping halves.

If mechanical stresses act during operation upon the connecting piece from the outside, and/or during pulsing internal pressurization, an additional detachable connection can be provided between the particular clamping halves and the connecting part, for example a locking connection. Even in extreme cases a secure connection is thereby ensured.

In another embodiment securing elements can be arranged on the clamping surfaces which in the clamping position are pressed into the external surface of the plug-in end, in particular in the form of barb-shaped raised parts.

The two clamping halves can be formed so that they each have the shape of one half of a longitudinally slit sleeve. In the clamping position, therefore, the clamping part is shaped as a hollow cylinder.

The connecting part advantageously has a cylindrical depression on the plug-in side into which the plug-in end can be inserted for centering with its form-face region. Preferentially an annular sealing is provided which surrounds the plug-in end when it is inserted which is arranged, in particular, in the depression of the connecting part and which seals the connecting piece against the hose or the pipeline to be connected forming a pressure means-tight seal. The connecting piece overall is advisably formed as plastic cast part or injection-molded part with the required sealing rings ideally being integrally structured on during manufacture.

Depending on the application the connecting piece can have several clamping parts and can contain, additionally or alternatively, one of several connecting parts in the form of screwed joints or threaded nipples. In the latter case the connecting part can be formed so that a screw tool can engage it. in contrast, the outside of the clamping part is preferentially rounded so that it is impossible to accidentally screw it off.

The various features of novelty which characterize the invention are pointed out with particularity in the claims annexed to and forming a part of this disclosure. For a better understanding of the invention, its operating advantages and specific objects obtained by its uses, reference is made to the accompanying drawings and descriptive matter in which preferred embodiments of the invention are illustrated.

BRIEF DESCRIPTION OF THE DRAWINGS In the drawings:

FIG. 2 is a perspective view of the connecting piece from FIG. 1 in the clamping position with inserted plug-in end;

FIG. 3 is a side view of the connecting piece of FIG. 1 and 2;

FIG. 4 is a top view in the axial direction of the clamping part of another embodiment of the invention;

FIG. 5 is a side view of another embodiment of the invention;

FIG. 6 is a longitudinal section of another embodiment of the invention; and

FIG. 7 is a longitudinal section of a connecting piece with coupled plug-in end in the clamping position showing the sealing.

In the individual Figures identically corresponding structural parts have identical reference numbers so that in case of repetitions renewed description is superfluous.

Figure 1:
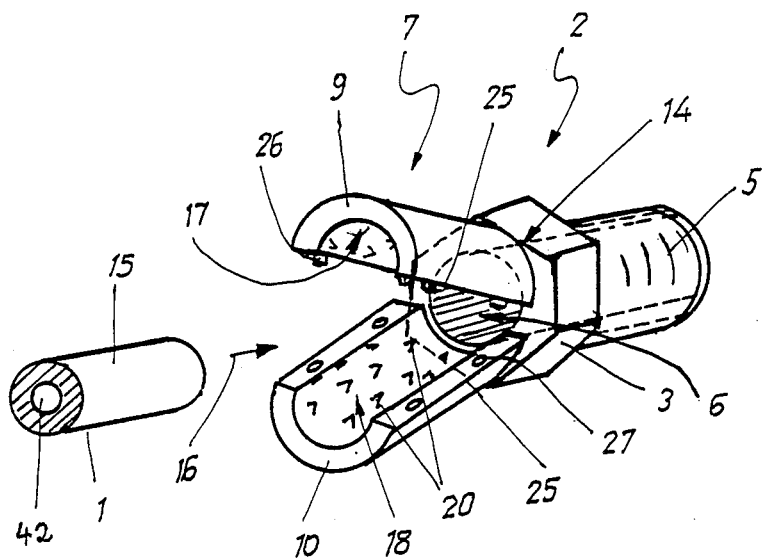
FIG. 1 is a perspective view of a first embodiment of the connecting piece according to the invention in the insertion position.

The embodiments of connecting pieces represented in the Figures are intended to connect hoses 1 carrying fluids with other fluid structural parts not further described here, for example, compressed air containers or cylinders of piston-cylinder units. Instead of hoses 1, these can also be pipelines or similar which like the hoses 1 have a resilient or elastic outer cover.

The connecting piece 2 shown in FIGS. 1 to 3 has a connecting part 3, which contains a continuous cylindrical opening 4 extending in the axial direction and whose outer contour is in the shape of an hexagon. Thereby use of a screw tool, for example a wrench, becomes possible in order to screw the connecting piece with its threaded nipple 5 adjoining the connecting part 3 in the axial direction into a corresponding bore of a pneumatic structural part. The threaded nipple 5, too, is penetrated by a through-hole 4' which borders on an opening 4 so that a common continuous opening 6 is available.

On the side of the connecting part 3 opposing the threaded nipple 5 a holding part is disposed formed as clamping part 7 which functions for fastening the hose 1 or similar detachably on connecting piece 2 and thereby to create a pressure-tight connection against the outside between the interior of the hose respectively hose channel 42 and the through-hole 6.

In contrast to FIGS. 1 to 3, with the connecting pieces 2' and 2" of FIGS. 5 and 6 instead of the threaded nipple a threaded bore 8 with inner threads is provided with which the particular piece can be screwed onto a threaded nipple arranged at another site.

According to FIGS. 1 to 3 the clamping part 7 has two half shell-shaped clamping halves 9 and 10. Each of the halves, thus, has the shape of one half of a hollow-cylindrical sleeve cut longitudinally. Both clamping halves 9 and 10 are with one of their front faces integrally formed to the axial side of the connecting part 3 via a bending point 14. This bending point 14 in the embodiment has the form of a web, i.e. the bending ability is achieved through small material thickness and through the choice of a material resiliently flexible in this area.

Depending on the bending position, the clamping halves 9 and 10 can assume a plug-in position in which they are arranged at greater or lesser distance to each other as is shown in FIGS. 1 and 3. In this position it is possible to insert the plug-in end 15 of the hose or similar into the clamping part 7. In the inserted state the two clamping halves 9 and 10 can be rotated toward each other with the bending point 14 as axis of rotation (arrow 13) until the two clamping halves 9 and 10 assume a clamping position shown in FIG. 2. In this clamping position they enclose the plug-in end 15 of the hose 1 completely and they rest with one clamping surface 17 and 18 on the sides of the clamping halves facing each other in the clamping position at the outer circumference of the plug-in end 15.

For uniform area pressure the clamping surfaces 17 and 18 are each provided with a curvature which corresponds essentially to that of the outer circumference of the hose. The clamping part 7, therefore, in the clamping position assumes a hollow-cylindrical shape extending coaxially to the continuous opening 6. It is obvious that the diameter of the clamping opening 19 is surrounded in the clamping position by the clamping halves is so adapted to the hose diameter that a given firm clamping effect is achieved which prevents displacement of the hose relative to the clamping part in the axial direction. It is, however, possible, as indicated in FIG. 1, to provide securing elements 20 on the clamping surfaces, in particular, in the form of barb-shaped raised parts projecting into the clamping opening 19 which in the clamping position according to FIG. 2 are pressed into the outer surface of the hose end 15 and hook into it.

Connecting piece 2 according to the invention consists preferentially of a synthetic material and is produced cost-effectively within the framework of a casting or injection-molding process. Immediately after completion of the manufacturing process the clamping halves 9 and 10 assume the arrangement shown in FIG. 3 relative to the connecting part 3, in which the longitudinal axis of the clamping surfaces 17 and 18 extends essentially at a right angle to the longitudinal direction of the through-hole 6. If the clamping halves are subsequently brought into the clamping position in order to connect a hose according to arrow 13, and if the connection is to be undone again, spreading open the clamping halves 9 and 10 to achieve a smaller opening when compared to the position of FIG. 3, for example into a position according to FIG. 1, suffices. What is required is only loosening of the pressure seating and removal of the optionally available securing elements 20 from the hose material.

The outer cylindrical contour of the clamping part 7 prevents, that in the event of unskilled handling of a wrench while screwing in the threaded nipple 5, the clamping part 7 is gripped and unscrewed in the process. It is, however, entirely possible to form the outer contour of the clamping parts corresponding to hose of the connecting part 3 as is the case in the embodiment according to FIG. 4.

A particularly favorable site for the bending points 14 for the clamping halves 9 and 10 is the on front face in the region of the outer circumference of the clamping hales (at 21).

In contrast to the embodiment according to FIG. 1 and 3, the clamping halves 9' and 10' of the embodiment according to FIG. 6 are formed as separate structural parts. Here, the clamping halves 9' and 10' when connecting a hose end are initially placed on it so that it is completely surrounded, and subsequently both clamping halves 9' and 10' are attached on the front face of connecting part 3' (right-hand side in FIG. 6). For this purpose a detachable connection is disposed between the particular clamping half and the connecting part which in the embodiment is formed as locking connection 22. After placing the clamping halves 9' and 10' around the hose end the entire arrangement along arrow 28 is inserted in the axial direction into the connecting part 3' with the clamping halves preferentially locking detachably into the connecting part 3'. According to FIG. 6, to this end, on the particular front face of the clamping halves 9' and 10' facing the connecting part 3' a semicircular locking projection 23 can be provided which can detachably engage a complementary locking groove 24 in the facing front face of the connecting part 3'. This arrangement can also be designed to function conversely.

In this embodiment the clamping halves 9' and 10' are preferentially produced integrally with the connecting part 3' and only broken off from it when needed. Losing it becomes thereby impossible. The areas indicated in FIG. 3 as bending points are for this purpose preferentially formed as intentional breaking points, for example by selecting a brittle synthetic material.

Should the connecting piece according to the invention be exposed to great loads when in operation, it can be provided to couple the embodiment according to FIG. 1 to 3 additionally with a locking connection 22 according to the one of FIG. 6. A corresponding embodiment is shown in FIG. 5. Here the locking projections 23 whose curvature best corresponds to that of the clamping surfaces gradually engages the loading groove 24 of the connecting part 3 upon bending in the direction of the clamping position.

Apart from the locking connection 22 it is advantageously provided to secure the clamping halves 9 and 10 in the clamping position against widening respectively spreading (cf. FIGS. 1 to 4). Securement takes place, for example according to FIGS. 1 to 3, with a plug connection of the two clamping halves 9 and 10. For this purpose, the edges of the clamping halves 9 and 10 extending in the longitudinal direction have on their contact surfaces 25 complementary pins respectively depression 26 and 27 which in the clamping position according to FIG. 2 engage each other. For a secure plug connection the diameter of the pins respectively depressions are so adapted to each other that plugging them into each other can only take place by applying pressure so that undoing the connection is only possible again by using force.

Should a plug connection not be sufficient for the required holding forces, it can also be provided to detachably lock the clamping halves in the clamping position into each other. This takes place, for example with corresponding formation of pins respectively depressions 26 and 27 or with a so-called external catch according to FIG. 3. When viewed in cross section the one edge 30 of the one clamping half 10 extending in the longitudinal direction is so formed that initially a section 31 is available extending from the associated clamping surface radially toward the outside which is adjoined by linear section 32 essentially extending in the circumferential direction which continues as a further linear section extending likewise in the radial direction toward the outer surface of the clamping half. The facing edge section of the other clamping half 9 is formed complementary to it, while on the opposing circumferential side the corresponding complementary form of the edge is precisely reversed. In the transition region between sections 31 and 32 undercuts of material result into which the corresponding lip 34 of the associated edge can lock.

In an embodiment not shown with clamping part formed corresponding to FIGS. 1 to 3, on both edges of the one clamping half a radially projecting rib extending in the longitudinal direction is integrally structured on which locks into a corresponding recess of the other clamping half.

Further, an embodiment not shown provides clamping the two clamping halves opposite each other with a guard ring which can be placed around them.

To undo the locking connection an unlocking device can be provided of which one is shown at 35 in FIG. 4. This is a depression 36 provided in the contact region 25 of the clamping halves 9 and 10 which permits inserting an unlocking tool, for example the flat tip of a screwdriver, and undoing the locking connection by rotating it.

In contrast to the through-hole 6 in FIG. 3, in the embodiment according to FIG. 7 the through-hole 6' is graded with the gradation 37 being arranged at the axial end of a depression 41 formed on the insertion side in the connecting part 3. The diameter of the depression corresponds to the outer diameter of the plug-in end 15 while the bore section 38 succeeding the depression has a diameter corresponding to the inner diameter of the plug-in end. This ensures turbulence-free throughflow, a corresponding formation can also be combined with the remaining embodiments.

In addition, in the embodiment according to FIG. 4 a sealing ring 39 surrounding the plug-in end 15 when it is inserted and sealing it against the connecting piece is available which sits in a corresponding recess of depression 36. It is preferentially injection-molded directly onto the connecting part 3 during manufacture so that it is fixed and cannot be lost. The same applies to a second sealing ring 40 provided in the region of the threaded nipple 5 which seals off the connecting piece relative to a pneumatic structural part which can be screwed to it.

It should be pointed out that o the connecting part 3 and 3', instead of the threaded nipple respectively the threaded bore also at least one further clamping part 7 can be provided. Moreover, this can also be a multiple connecting piece in which several clamping parts respectively threaded nipples are additionally or alternatively available.

It is understood that the clamping surfaces do not necessarily need to be formed uninterruptedly, rather, the clamping halves can also have perforations to save material which also refer to the clamping surfaces.

A significant advantage of the connecting piece is that it can be manufactured rapidly and cost-effectively in one piece. It can, for example, be injection molded in a nest of a mold completely without insertion part, or even together with the possibly available sealing rings 39 and 40.

While specific embodiments of the invention have been shown and described in detail to illustrate the application of the principles of the invention, it will be understood that the invention may be embodied otherwise without departing from such principles.

What is claimed is:

1. A connecting piece for connecting a fluid conveying tubular member with a fluid conveying duct comprising:

a connecting portion having a front end for connection to a pluggable end of the tubular member and an opposite, rear end for connection to a duct, an internal bore extending between the front and rear ends, and an annular depression extending around the bore adjacent the front end, a resiliently compressible sealing ring retained in said depression;

a holding portion molded in one-piece with the connecting portion for holding the tubular member in the front end of the connecting portion and comprising a pair of half-shell clamping halves each having a clamping surface of a shape corresponding to an outer surface of the pluggable end of the tubular member, each clamping half being integrally joined at one of their respective ends to opposite locations of the front end of the connecting portion by a flexible portion for pivotal movement from an unclamping condition, in which the clamping halves are remote from each other to a clamping condition, in which the clamping halves are adjacent each other with their respective clamping surfaces in clamping engagement with oppositely facing outer surface portions of the tubular member, with the pluggable end of the tubular member received in the bore and the sealing ring in encircling sealing engagement therewith;

means integrally formed with the connecting piece for releasably locking the halves together in the clamping condition including a selected one of a complimentary plug and socket connection and latching parts engageable in a snap action on pivoting the clamping halves together into the clamping condition; and, release means integrally formed on the clamping halves and engageable by a tool to release the locking means to permit separation of the clamping halves.

2. A connecting piece according to claim 1, wherein said flexible portion is a web with small material thickness.

3. A connecting piece according to claim 2, wherein said means releasably locking said halves together includes a releasable locking connection provided between said clamping halves and said connecting part such looking connection comprising complementary, interengageable, arcuate, rib and groove means provided on portions of the clamping halves adjacent to the front end of said connecting portion and encircling the bore adjacent the front end of the connecting portion, respectively, the groove means being undercut in the direction of the bore axis to provide abutment surface means extending transversely of the bore axis, the rib and groove means being progressively engageable during pivotal movement of the clamping halves together into the clamping condition to lock the clamping halves and connecting part against relative axial movement apart.

4. A connecting piece according to claim 1 wherein said release means comprises a depression extending between said clamping halves for receipt of an unlocking tool for releasing said clamping halves from said clamped condition.

5. A connecting piece according to claim 1 wherein said clamping surfaces have securing elements comprising barb-shaped parts pressable into an external surface of the tubular member by movement of the clamping halves together about the tubular member into said clamping position.

6. A connecting piece according to claim 1 wherein the connecting portion is formed with at least one screw-form connection adjacent the rear end.

7. A connecting piece according to claim 1 wherein the front end of said connecting part has a counter-bore receiving said leading end of the tubular member.

8. A connecting piece according to claim 1, wherein said sealing ring is injection molded in said recess during manufacture of the connection piece to form an integral part therewith.

9. A connecting piece for connecting a fluid conveying tubular member with a fluid conveyor duct comprising:

a connecting portion having a front end for connection to a pluggable end of the tubular member and an opposite, rear end for connection to a duct, an internal bore extending between the front and rear ends, and an annular depression extending around the bore adjacent the front end, a resiliently compressible sealing ring retained in said depression;

a holding portion molded in one-piece with the connecting portion for holding the tubular member in the front end of the connecting portion and comprising a pair of half-shell clamping halves each having a clamping surface of a shape corresponding to an outer surface of the pluggable end of the tubular member, each clamping half being integrally joined at one of their respective ends to opposite locations of the front end of the connecting portion in an unclamping condition, in which the clamping halves are remote from each other, by a frangible portion by which the clamping halves can be broken off the connecting portion as loose-pieces enabling movement together to a clamping condition, in which the clamping halves are adjacent each other with their respective clamping surfaces in clamping engagement with oppositely facing outer surface portions of the tubular member, with the pluggable end of the tubular member received in the bore and the sealing ring in encircling sealing engagement therewith;

means integrally formed with respective clamping halves for releasably locking the halves together in the clamping condition including a selected one of a complementary plug and socket connection and latching parts engageable in a snap action on pivoting the clamping halves together into the clamping condition;

release means integrally formed on the clamping halves and engageable by a tool to release the locking means to permit separation of the clamping halves; and, interengageble means on the clamping halves and the connecting portion operable by insertion of the clamping halves in the clamping condition into the front end of the connecting portion to provide a releasable locking connection between the clamping halves and the connecting piece preventing axial separation thereof.

10. A connection piece according to claim 9, wherein said release means comprises a depression extending between said clamping halves for receipt of an unlocking tool for releasing said clamping halves from said clamped condition.

11. A connecting piece according to claim 9, wherein the releasable locking means preventing axial separation of the clamping halves and said connecting portion such locking connection comprises complementary, interengageable, arcuate, rib and groove means provided on portions of the clamping halves adjacent to the front end of said connecting portion and encircling the bore adjacent the front end of the connecting portion, respectively, the groove means being undercut in the direction of the bore axis to provide abutment surface means extending transversely of the bore axis, the rib and groove means being progressively engageable during pivotal movement of the clamping halves together into the clamping condition to lock the clamping halves and connecting part against relative axial movement apart.

12. A connecting piece according to claim 9, wherein said clamping surfaces have securing elements comprising barb-shaped parts pressable into an external surface of the tubular member by movement of the clamping halves together about the tubular member into said clamping position.

13. A connecting piece according to claim 9, wherein the connecting portion is formed with at least one screw-form connection adjacent the rear end.

14. A connecting piece according to claim 9, wherein the front end of said connecting part has a counter bore receiving said leading end of the tubular member.

15. A connecting piece according to claim 9, wherein said sealing ring is injection molded in said recess during manufacture of the connecting piece to form an integral part therewith.

16. A connecting piece for connecting a fluid conveying tubular member with a fluid conveying duct comprising:

a connecting portion having a front end for connection to a pluggable end of the tubular member and an opposite, rear end for connection to a duct, an internal bore extending between the front and rear ends, and an annular depression extending around the bore adjacent the front end, a resiliently compressible sealing ring retained in said depression;

a holding portion molded in one-piece with the connecting portion for holding the tubular member in the front end of the connection portion and comprising a pair of half-shell clamping halves each having a clamping surface of a shape corresponding to an outer surface of the pluggable end of the tubular member, each clamping half being integrally joined at one of their respective ends to opposite locations of the front end of the connecting portion by a flexible portion for pivotal movement from an unclamping condition, in which the clamping halves are remote from each other to a clamping condition, in which the clamping halves are adjacent each other with their respective clamping surfaces in clamping engagement with oppositely facing outer surface portions of the tubular member, with the pluggable end of the tubular member received in the bore and the sealing ring in encircling sealing engagement therewith;

means integrally formed with the connecting piece for releasably locking the halves together in the clamping condition including a selected one of a complimentary plug and socket connection and latching parts engageable in a snap action on pivoting the clamping halves together into the clamping condition; and, release means comprising recesses formed in opposed locations in ends of respective clamping halves remote from the flexible portions together defining a release slot receiving a blade-form releasing tool, spaced apart walls of respective recesses being engageable simultaneously by opposite edges of the inserted tool when twisted, thereby to urge the walls apart, opening the slot and forcing the clamping halves apart into a release condition.

17. A connecting piece according to claim 16, wherein the clamping halves have respective end faces remote from the respective hinges and the recesses are formed in respective end faces.

* * * * *